US008680816B2

United States Patent
Li

(10) Patent No.: US 8,680,816 B2
(45) Date of Patent: Mar. 25, 2014

(54) BATTERY CHARGER FOR MOBILE ROBOTIC VACUUM CLEANER

(75) Inventor: Gary Li, Guangdong (CN)

(73) Assignee: Egenpower Inc., Laguna Niguel, CA (US)

( * ) Notice: Subject to any disclaimer, the term of this patent is extended or adjusted under 35 U.S.C. 154(b) by 424 days.

(21) Appl. No.: 12/982,294

(22) Filed: Dec. 30, 2010

(65) Prior Publication Data

US 2012/0086389 A1   Apr. 12, 2012

(30) Foreign Application Priority Data

Oct. 11, 2010   (CN) .......................... 2010 2 0575543

(51) Int. Cl.
*H02J 7/00*   (2006.01)

(52) U.S. Cl.
USPC .......................................... 320/137; 320/107

(58) Field of Classification Search
USPC ............. 320/107, 114, 115, 137; 318/568.11, 318/568.12, 568.2; 901/24, 35, 47, 1; 73/1.82, 703; 702/39, 159, 171
See application file for complete search history.

(56) References Cited

U.S. PATENT DOCUMENTS

| | | | |
|---|---|---|---|
| 6,841,963 B2 * | 1/2005 | Song et al. ............... | 318/568.12 |
| 7,286,902 B2 * | 10/2007 | Kim et al. ..................... | 700/245 |
| 7,489,985 B2 * | 2/2009 | Ko et al. ....................... | 700/259 |
| 7,546,179 B2 * | 6/2009 | Lee et al. ...................... | 700/245 |
| 7,630,792 B2 * | 12/2009 | Kim ............................... | 700/245 |
| 7,970,491 B2 * | 6/2011 | Lee et al. ...................... | 700/245 |
| 8,060,256 B2 * | 11/2011 | Kong et al. ................... | 700/258 |
| 8,386,081 B2 * | 2/2013 | Landry et al. ................. | 700/253 |
| 2005/0137749 A1 * | 6/2005 | Jeon et al. ..................... | 700/245 |
| 2005/0156562 A1 * | 7/2005 | Cohen et al. .................. | 320/107 |
| 2006/0066284 A1 * | 3/2006 | Tani ............................... | 320/114 |
| 2007/0267998 A1 * | 11/2007 | Cohen et al. .................. | 320/109 |
| 2008/0058987 A1 * | 3/2008 | Ozick et al. ................... | 700/250 |
| 2008/0161969 A1 * | 7/2008 | Lee et al. ...................... | 700/245 |
| 2009/0228165 A1 * | 9/2009 | Ozick et al. ...................... | 701/23 |

* cited by examiner

*Primary Examiner* — Richard V Muralidar
*Assistant Examiner* — Steve T Chung
(74) *Attorney, Agent, or Firm* — Muncy, Geissler, Olds & Lowe, P.C.

(57) ABSTRACT

A battery charger having a charging side at the body thereof for receiving and charging a mobile robotic vacuum cleaner is disclosed. The charging side has a groove, a sound wave transmitter mounted in the groove and a baffle mounted in the groove in front side of the sound wave transmitter for reflecting the sound wave transmitted by the ultrasonic transmitter toward two opposite lateral sides of the charging side along the groove to form two opposing sound wave beams to form two opposing sound wave beams for receiving by a sound wave receiver of the mobile robotic vacuum cleaner for determination of the steering direction. Subject to the guide of the sound wave beams, the mobile robotic vacuum cleaner is accurately guided to the battery charger and will not pass over or impact the battery charger.

5 Claims, 5 Drawing Sheets

BATTERY CHARGER FOR MOBILE ROBOTIC VACUUM CLEANER

BACKGROUND OF THE INVENTION

1. Field of the Invention

The present invention relates to mobile robotic vacuum cleaner technology and more specifically, to a battery charger used in a mobile robotic vacuum cleaner.

2. Description of the Related Art

A self-charging mobile robotic vacuum cleaner is known comprising a mobile robotic vacuum cleaner and an automatic battery charger for charging the mobile robotic vacuum cleaner. The self-charging system of the self-charging mobile robotic vacuum cleaner is that the automatic battery charger comprises an infrared signal emitter, and the mobile robotic vacuum cleaner comprises an infrared sensor. When the battery power of the mobile robotic vacuum cleaner is low and the mobile robotic vacuum cleaner is around the battery charger, the infrared sensor of the mobile robotic vacuum cleaner will sense the signal emitted by the infrared emitter. At this time, the mobile robotic vacuum cleaner will move to the battery charger subject to a predetermined path and keep attached to the battery charger for charging by the battery charger.

According to the aforesaid self-charging mobile robotic vacuum cleaner, the self-charging system may be obstructed due to an abnormality of signal receiving angle, the presence of a shielding object or other factors, causing the mobile robotic vacuum cleaner to pass by, or even to strike down the battery charger.

Therefore, the aforesaid self-charging mobile robotic vacuum cleaner is still not satisfactory in function. An improvement in this regard is necessary.

SUMMARY OF THE INVENTION

The present invention has been accomplished under the circumstances in view. It is the main object of the present invention to provide a battery charger for mobile robotic vacuum cleaner, which facilitates battery charging of the mobile robotic vacuum cleaner, avoiding the mobile robotic vacuum cleaner from passing over or impacting the battery charger.

To achieve this and other objects of the present invention, a battery charger is for use with a mobile robotic vacuum cleaner that comprises at least one ultrasonic sound wave receiver and a plurality of electrodes. The battery charger comprises a battery charger body. The battery charger body comprises a charging side for receiving the mobile robotic vacuum cleaner, and a plurality of electrically conductive members located on the charging side for the contact of the electrodes of the mobile robotic vacuum cleaner for enabling the mobile robotic vacuum cleaner to be electrically charged by the battery charger body. The charging side comprises a groove, a sound wave transmitter mounted in the groove and adapted for transmitting a sound wave, and a baffle mounted in the groove in a front side relative to the sound wave transmitter and adapted for reflecting the sound wave transmitted by the ultrasonic transmitter toward two opposite lateral sides of the charging side along the groove to form two opposing sound wave beams for receiving by the sound wave receiver of the mobile robotic vacuum cleaner for determination of the steering direction.

DETAILED DESCRIPTION OF THE INVENTION

Figure 1:
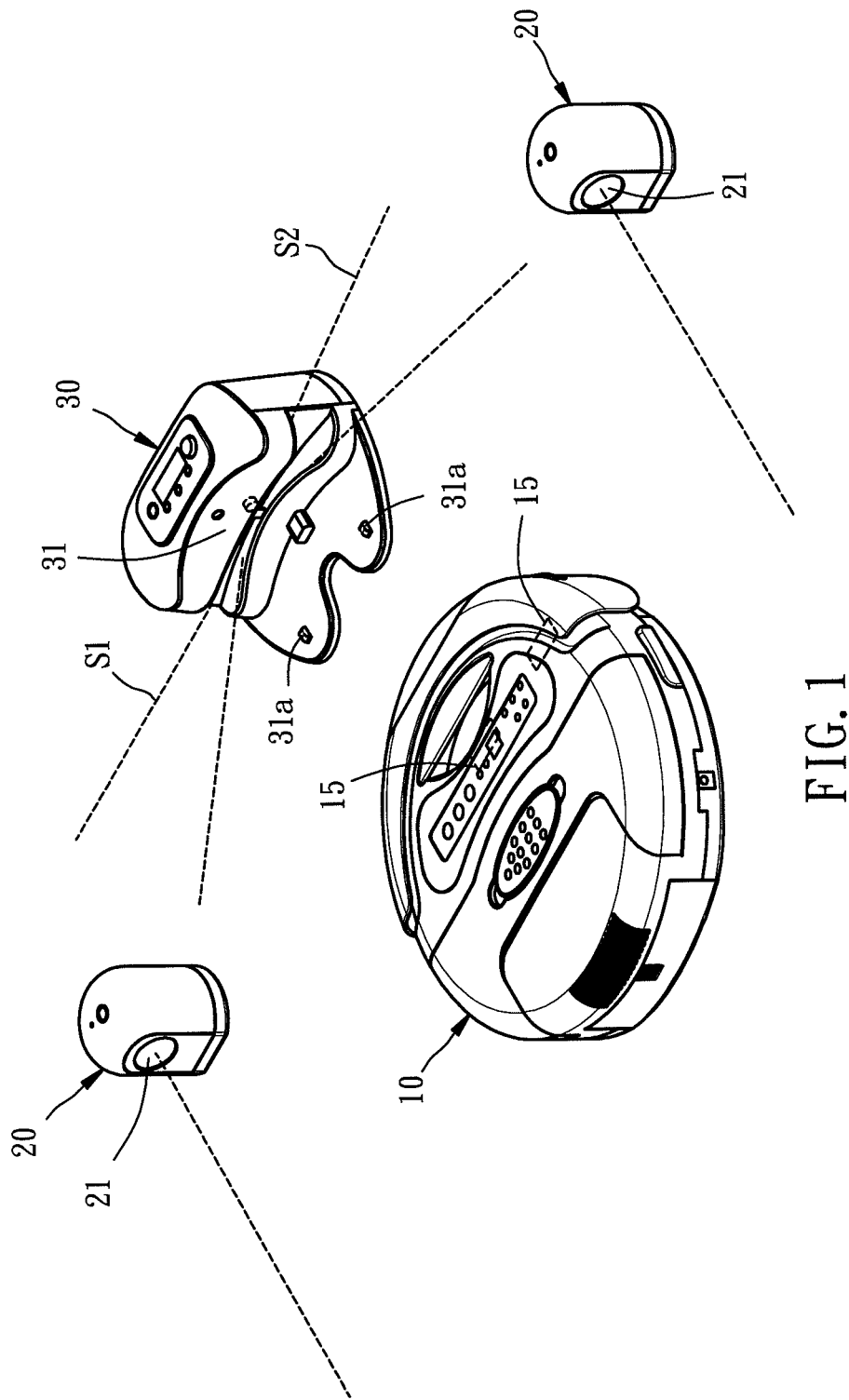
FIG. 1 is schematic elevational view of a mobile robotic vacuum cleaner, a battery charger body and virtual wall generators in accordance with the present invention.
Figure 2:
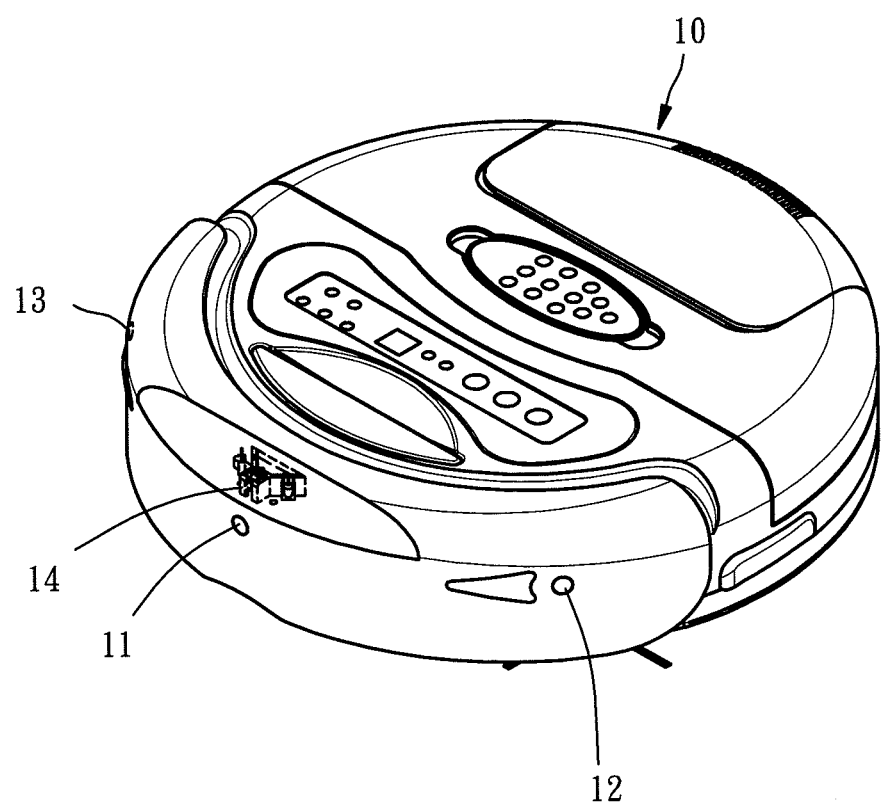
FIG. 2 is an oblique elevation, in an enlarged scale, of the mobile robotic vacuum cleaner shown in FIG. 1.
Figure 3:
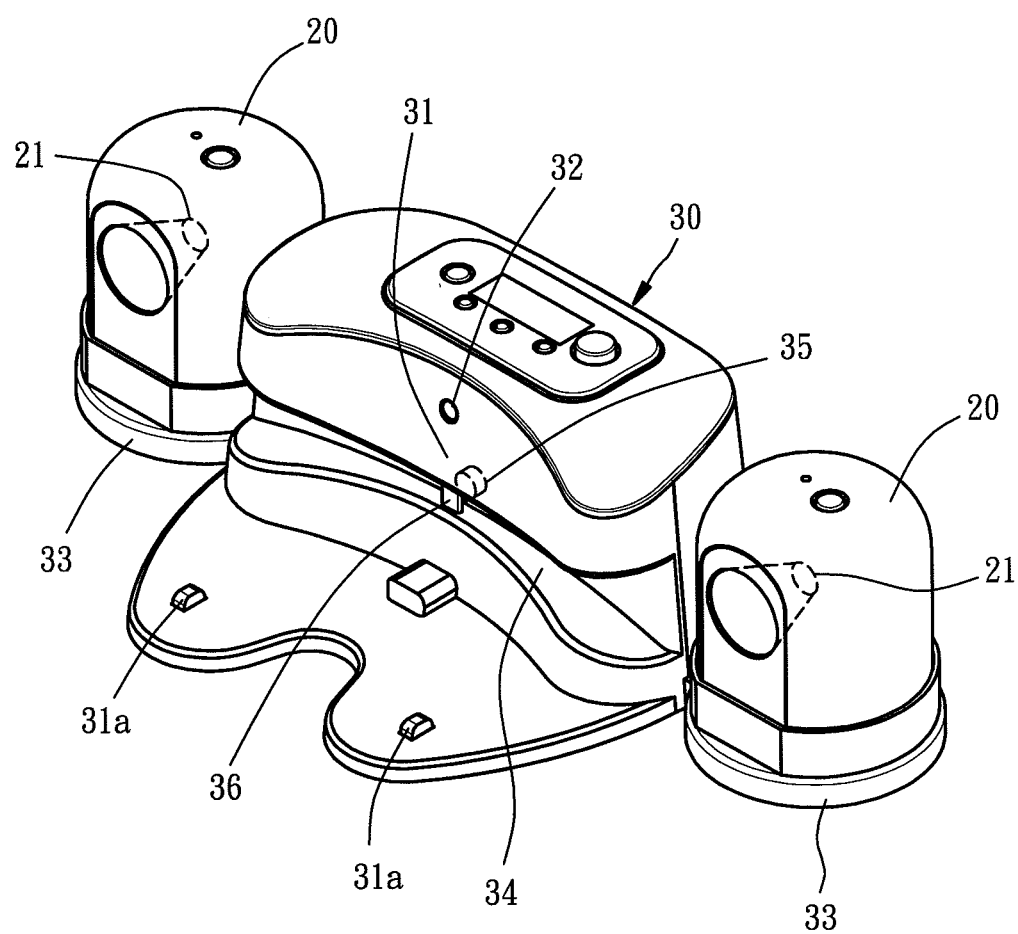
FIG. 3 is an elevational assembly view of the battery charger body and the virtual wall generators in accordance with the present invention.
Figure 4:
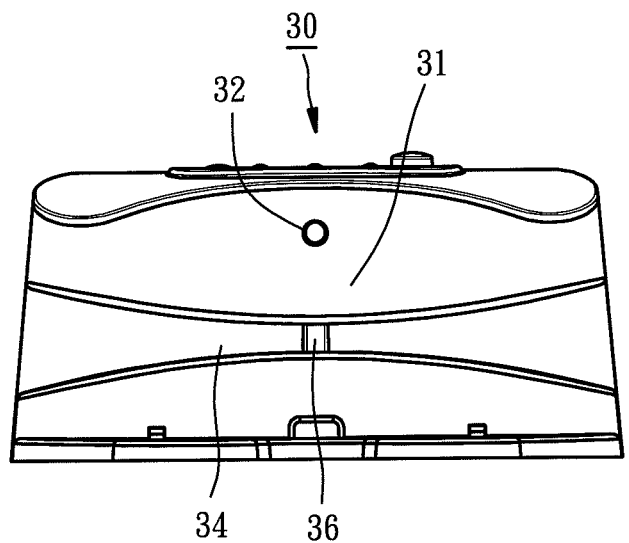
FIG. 4 is a front view of the battery charger body in accordance with the present invention.
Figure 5:
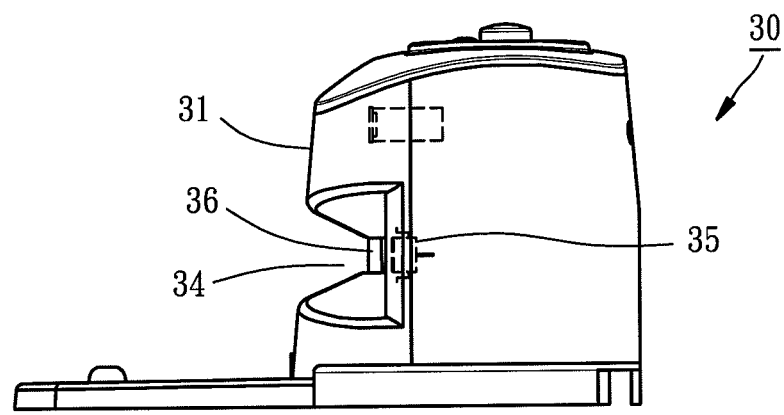
FIG. 5 is a side view of the battery charger body in accordance with the present invention.

Referring to FIGS. 1-6, a battery charger for mobile robotic vacuum cleaner in accordance with the present invention is shown comprising a battery charger body 30 for the approaching of a mobile robotic vacuum cleaner 10 for charging, and two virtual wall generators 20 adapted for generating virtual walls to limit the range of movement of the mobile robotic vacuum cleaner 10.

The mobile robotic vacuum cleaner 10 comprises three sound wave receivers 11,12,13, a signal receiver 14 and a plurality of electrodes 15 located on the bottom wall thereof. The sound wave receivers 11,12,13 are adapted for receiving sound waves generated by the battery charger body 30. However, it is to be understood that the number of 3 of the sound wave receivers is simply an example but not a limitation. One single sound wave receiver can also achieve the expected result. The signal receiver 14 is adapted for receiving a signal transmitted by the battery charger body 30, enabling the mobile robotic vacuum cleaner 10 to be controlled to approach to the battery charger body 30 for charging. Further, the mobile robotic vacuum cleaner 10 also comprises a steering mechanism and a control device for controlling steering mechanism to change the steering direction. As the steering mechanism and the control device are of the known art and not within the scope of the spirit of the present invention, no further detailed description in this regard is necessary.

Each virtual wall generator 20 comprises a sound wave transmitter 21. The sound wave receivers 11,12,13 of the mobile robotic vacuum cleaner 10 can receive the sound wave transmitted by the virtual wall generator 20 generated by each sound wave transmitter 21 to control the steering direction of the mobile robotic vacuum cleaner 10, thereby constraining the range of movement of the mobile robotic vacuum cleaner 10. This control technique is of the known art, no further detailed description in this regard is necessary.

The battery charger body 30 comprises a charging side 31 for the receiving the mobile robotic vacuum cleaner 10, and a plurality of electrically conductive members 31a located on the charging side 31 for the contact of the electrodes 15 of the mobile robotic vacuum cleaner 10 for enabling the mobile robotic vacuum cleaner 10 to be electrically charged by the battery charger body 30. Further, a signal transmitter 32 is installed in the charging side 31 adapted for transmitting an invisible signal receivable by the signal receiver of the mobile robotic vacuum cleaner 10 to guide the mobile robotic vacuum cleaner 10 toward the battery charger body 30 for charging. The battery charger body 30 further comprises two sub charging units 33 respectively disposed at two opposite lateral sides of the charging side 31 for receiving and charging the virtual wall generators 20. The sub charging units 33 can be formed integral with the battery charger body 30.

Figure 6:
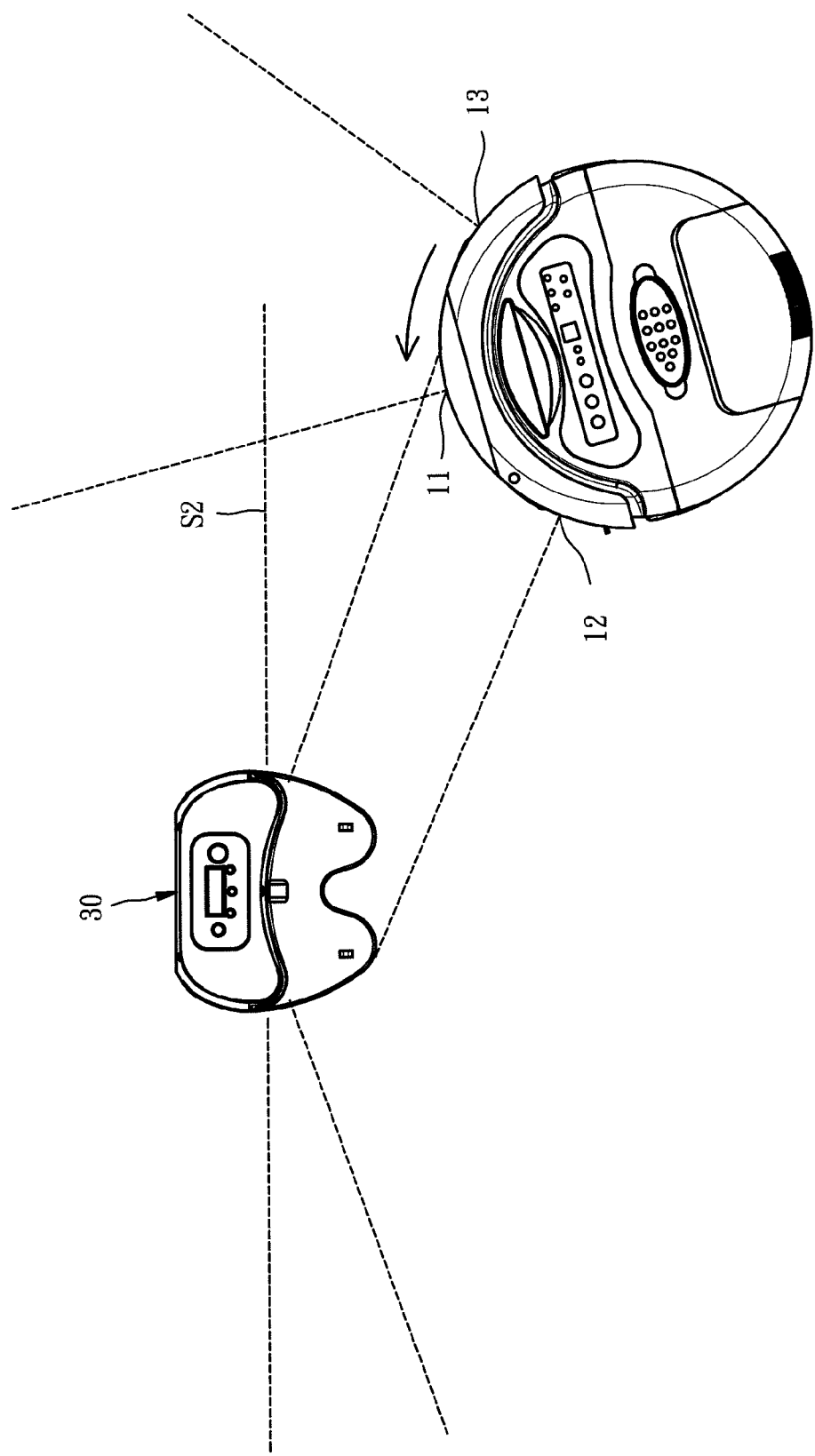
FIG. 6 is a schematic drawing illustrating a steering operation of the mobile robotic vacuum cleaner in accordance with the present invention.

Further, the battery charger body 30 provides a first sound wave S1 and a second sound wave S2 toward the two opposite lateral sides of the charging side 31. The formation of the first sound wave S1 and the second sound wave S2 and the related structure are: the battery charger body 30 comprises a horizontal groove 34 located on the charging side 31, a sound wave transmitter 35 mounted in the horizontal groove 34, and a baffle 36 mounted in the horizontal groove 34 in front of the sound wave transmitter 35. The horizontal groove 34 has a width gradually increasing from the mid part toward the two distal ends thereof. Thus, when the sound wave transmitter 35 transmits a sound wave, the baffle 36 will block the sound wave and reflect the sound wave toward the two opposite lateral sides of the charging side 31 along the horizontal groove 34, thereby forming the first sound wave beam S1 and the second sound wave beam S2 that have particular horizontal and vertical angles. Thus, when at least one of the sound wave receivers 11,12,13 of the mobile robotic vacuum cleaner 10 receives the first sound wave beam S1 or second sound wave beam S2, the mobile robotic vacuum cleaner 10 can be controlled to change the steering direction, as shown in FIG. 6, and will not pass over the battery charger body 30 or impact one lateral side of the battery charger body 30, and therefore the mobile robotic vacuum cleaner 10 can return to the accurate path and be accurately charged. Further, if there is any obstacle in between the battery charger body 30 and the mobile robotic vacuum cleaner 10, the first sound wave beam S1 and the second sound wave beam S2 can pass over the obstacle through reflection or diffraction, enabling the mobile robotic vacuum cleaner 10 to effectively sense the first sound wave beam S1 and the second sound wave beam S2 and to achieve the expected result.

As stated above, when compared to the conventional designs, the invention effectively avoids the mobile robotic vacuum cleaner 10 from passing over or impacting the charger body 30, assuring smooth performance of the charging operation. Further, the battery charger of the present invention can also provide virtual walls to constrain the moving path of the mobile robotic vacuum cleaner.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A battery charger for use with a mobile robotic vacuum cleaner, said mobile robotic vacuum cleaner comprising at least one ultrasonic sound wave receiver and a plurality of electrodes, said battery charger comprising:

a battery charger body, said battery charger body comprising a charging side for receiving said mobile robotic vacuum cleaner and a plurality of electrically conductive members located on said charging side for the contact of the electrodes of said mobile robotic vacuum cleaner for enabling said mobile robotic vacuum cleaner to be electrically charged by said battery charger body, said charging side comprising a groove, a sound wave transmitter mounted in said groove and adapted for transmitting a sound wave and a baffle mounted in said groove in a front side relative to said sound wave transmitter and adapted for reflecting the sound wave transmitted by said ultrasonic transmitter toward two opposite lateral sides of said charging side along said groove to form two opposing sound wave beams for receiving by said sound wave receiver of said mobile robotic vacuum cleaner for determination of the steering direction.

2. The battery charger as claimed in claim 1, wherein said sound wave transmitter is mounted in a mid point in said groove; said groove has a width gradually increasing from said mid point toward two distal ends thereof.

3. The battery charger as claimed in claim 2, wherein said groove is made relatively deeper in direction from said mid point toward the two distal ends thereof.

4. The battery charger as claimed in claim 1, wherein said battery charger body further comprises a signal transmitter mounted in said charging side and adapted for transmitting a signal; said mobile robotic vacuum cleaner further comprises a signal receiver adapted for receiving the signal transmitted by said signal transmitter of said battery charger body for controlling said mobile robotic vacuum cleaner to move toward said charging side of said battery charger body.

5. The battery charger as claimed in claim 1, wherein said battery charger body further comprises two sub charging units disposed at two opposite lateral sides of said charging side for charging at least one virtual wall generator, each said virtual wall generator comprising a sound wave transmitter adapted for transmitting a sound wave; said sound wave receiver of said mobile robotic vacuum cleaner is capable of receiving the sound wave transmitted by the sound wave transmitter of each said virtual wall generator for controlling the steering direction of said mobile robotic vacuum cleaner.

* * * * *